Figure 16:
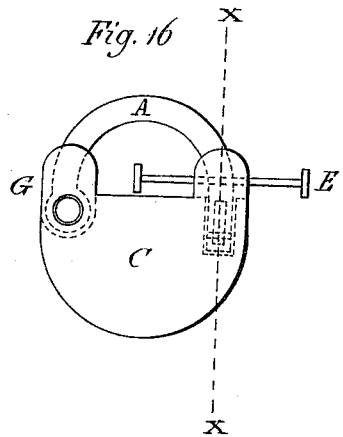

(Model.)
2 Sheets—Sheet 1.
S. A. HOSFORD.
SEAL LOCK.
No. 269,935. Patented Jan. 2, 1883.
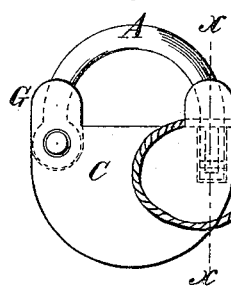
Fig. 1
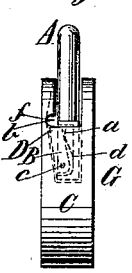
Fig. 2
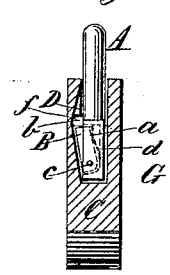
Fig. 3
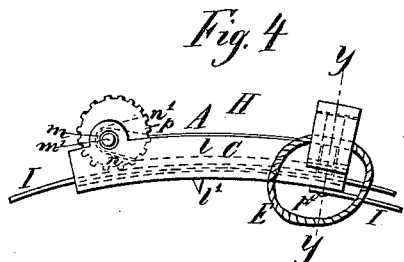
Fig. 4
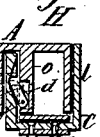
Fig. 5
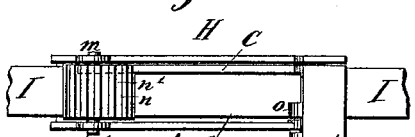
Fig. 6
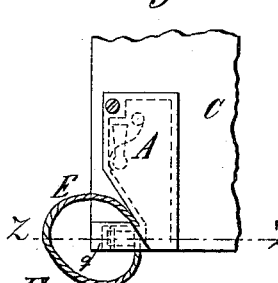
Fig. 7
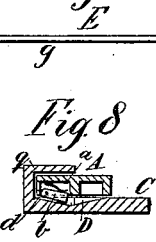
Fig. 13 / Fig. 8
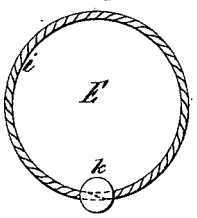
Fig. 14
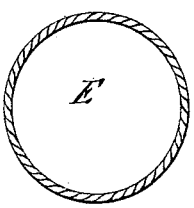
Fig. 15
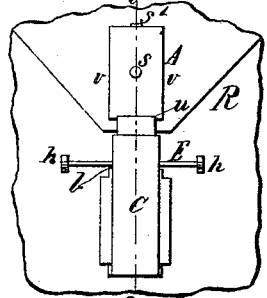
Fig. 11
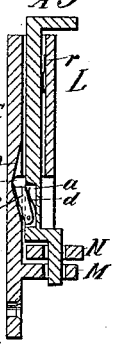
Fig. 9
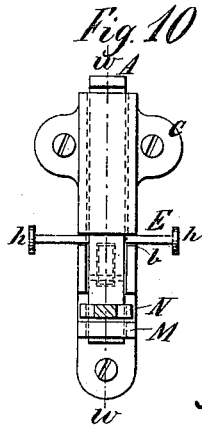
Fig. 10
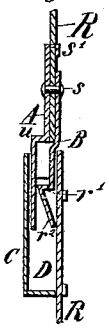
Fig. 12
Witnesses:
John C. Rae
Jacob L. Storer
Inventor:
Seymour A. Hosford,
by Jacob L. Storer
Attorney.
N. PETERS, Photo-Lithographer, Washington, D. C.

(Model.) 2 Sheets—Sheet 2.
S. A. HOSFORD.
SEAL LOCK.
No. 269,935. Patented Jan. 2, 1883.

WITNESSES:
Wm A. Lowe
Jacob J. Storer

INVENTOR
Seymour A. Hosford,
BY Jacob J. Storer,
ATTORNEY

UNITED STATES PATENT OFFICE.

SEYMOUR A. HOSFORD, OF ELMIRA, NEW YORK, ASSIGNOR TO JOHN C. RAE, OF SAME PLACE.

SEAL-LOCK.

SPECIFICATION forming part of Letters Patent No. 269,935, dated January 2, 1883.

Application filed March 3, 1882. (Model.)

*To all whom it may concern:*

Be it known that I, SEYMOUR A. HOSFORD, of Elmira, in the county of Chemung and State of New York, have invented a new and useful Improvement in Sealing and Locking Devices, of which the following is a specification.

The object of this invention is to provide a more simple, secure, and easily-applied sealing and locking device adapted for general use, such as for cars, boxes, bags, envelopes, and other vessels or things.

The invention consists of a suitable support carrying a movable dog, and, in combination therewith, of a grooved and socketed frame or plate designed for the reception of the free end of the dog; and, further, of a continuous ring or closed or completed seal designed to be applied to hold the dog in the opposite socket, and thereby seal and lock the article to which the device is applied, all of which will be hereinafter described.

Figure 1 is a side elevation of the device applied to a padlock, the ordinary locking mechanism of the padlock being dispensed with. Fig. 2 is a front elevation of the same. Fig. 3 is a vertical section of the same on line $xx$, Fig. 1. Fig. 4 is a side elevation of a bag-fastener with the improved locking and sealing device applied. Fig. 5 is a vertical section of the same on line $yy$, Fig. 4. Fig. 6 is a plan of the same. Fig. 7 is a front elevation, showing the improved device applied to an escutcheon and lock-case. Fig. 8 is a cross-section of the same on line $zz$, Fig. 7. Fig. 9 is a vertical sectional elevation, showing the device applied to a bolt, on line $ww$, Fig. 10. Fig. 10 is a front elevation of the same. Fig. 11 is a front elevation of a portion of a letter-envelope with the device attached. Fig. 12 is a sectional side elevation of the same on line $vv$, Fig. 11. Figs. 13, 14, and 15 are elevations of completed seals of various designs used in combination with the other parts of the device. Fig. 16 is a side elevation of a padlock with my improved locking device, with the double-headed bar seal applied thereto.

Similar letters of reference indicate corresponding parts.

In the drawings, A represents a support, which may be a padlock-hasp, as shown in Figs. 1, 2, and 3, the hasp of a bag-fastener, as shown in Figs. 4, 5, and 6, a lock-escutcheon, as shown in Figs. 7 and 8, a car or other bolt, as shown in Figs. 9 and 10, an envelope attachment, as shown in Figs. 11 and 12, or some other suitable support. In each of said supports A is formed a recess, $a$, in which, excepting in the case of the envelope, Figs. 11 and 12, is a dog, B, pivoted through the lower end, the dog B being, in the case of the envelope device, riveted to the support.

C represents a plate, which may be a padlock-case, as shown in Figs. 1, 2, and 3, the frame of a bag-fastener, as shown in Figs. 4, 5, and 6, a lock-case, as shown in Figs. 7 and 8, a bolt-plate, as shown in Figs. 9 and 10, or an envelope attachment, as shown in Figs. 11 and 12. In each of said plates C is formed, for the reception of the free end of the dog B, a socket, D, across the deepest portion of which, and extending on either side thereof, is a groove, $b$, designed for receiving the wire rod or bar of a completed seal.

E represents a closed or completed seal. That shown in Fig. 13 is a simple straight rod or bar of metal, $g$, having a button or head, $h$, on each end, thereby closing it and preventing its withdrawal from the sealing or locking device. In Fig. 14 the seal E is shown to be a piece of wire, $i$, bent in circular form, and having its two ends immovably secured in a disk or button, $k$, while the seal E shown in Fig. 15 is a simple continuous ring of metal—a seal constructed with closed ends.

It will be seen, then, that my improved sealing and locking device preserves its essential characteristics, wherever or for whatever purpose it may be applied, and that it may be adapted to many uses without requiring important modifications in any instance.

In Figs. 1, 2, and 3 the dog B is pivoted by a pin, $c$, in a recess, $a$, formed near the free end and in the side of the padlock hasp or support A, and has its free upper end normally held out by a spring, $d$, which is fixed in said recess $a$.

In the inner face of the padlock-case or plate C (G indicates the padlock) is a vertical socket, D, that is made comparatively deep at its center, as indicated at f, and shallow or running out to nothing at the ends, and centrally across this socket D is formed a groove, b, whose deepest part coincides with that of the said socket. When this padlock G is applied for the purpose of locking and sealing any object a completed or closed seal, E, is applied by laying its bar, rod, or wire in the groove b, slightly bending said bar, rod, or wire to conform with the shape of said groove, and the support or hasp A is turned down, with the effect of forcing the dog B down past said seal, rod, bar, or wire. Then the spring of the dog operates to force the free end of the latter, so that it shall engage against and beneath said seal, rod, bar, or wire, and be immovably held, holding also the said support or hasp A locked and sealed, as the latter cannot be withdrawn without first breaking the seal, rod, bar, or wire and drawing it through the groove b.

It will be seen that all these locking and sealing devices are essentially the same in character and construction, and that they are all locked and sealed by means of a seal that is completed before application, and that hence the locking and sealing may be accomplished in much less time than by the use of a seal that must be closed or completed after application. None of the seals herein shown and described can be disengaged without rupture from the devices to which they are applied.

This sealing and locking device is designed to be applied to car-locks, padlocks, and locks of any other kind or description.

I do not broadly claim a completed seal, nor a seal consisting of an unbroken ring of metal, nor a seal consisting of a piece bent in circular form and having its ends firmly fixed in a terminal disk or button.

Having thus described my invention, I claim as new and desire to secure by Letters Patent—

1. In a sealing and locking device, as a means for holding the seal, the combination, with the dog B and support A, of the frame or plate C, provided with socket D and cross-groove b, substantially as herein shown and described.

2. The combination, with the padlock G, provided with dog B and socket and cross-groove D b, respectively, of a closed or completed seal, E, substantially as herein shown and for the purpose described.

3. In a sealing and locking device, as a means for simultaneously sealing and locking, a seal consisting of a double-headed bar of metal, substantially as herein shown and described.

SEYMOUR A. HOSFORD.

Witnesses:
H. V. RANSOM,
JOHN C. RAE.